United States Patent [19]
Riedel

[11] Patent Number: 4,813,826
[45] Date of Patent: Mar. 21, 1989

[54] DOOR HARDWARE PREPARATION JIG

[76] Inventor: Raymond R. Riedel, 8047 S. 13th St., Phoenix, Ariz. 85040

[21] Appl. No.: 142,012

[22] Filed: Jan. 11, 1988

[51] Int. Cl.[4] .......... B23B 41/00
[52] U.S. Cl. .......... 408/108; 408/3; 408/115 R; 33/197
[58] Field of Search .......... 408/3, 26, 95, 97, 108, 408/115 R; 33/197

[56] References Cited

U.S. PATENT DOCUMENTS

| | | | |
|---|---|---|---|
| 2,519,468 | 8/1950 | Hengst | 408/97 |
| 2,843,167 | 7/1958 | Rushton | 33/197 |
| 3,212,366 | 10/1965 | Russell et al. | 408/97 |
| 4,306,823 | 12/1981 | Nashlund | 408/108 |

*Primary Examiner*—Gil Weidenfeld
*Assistant Examiner*—Daniel W. Howell
*Attorney, Agent, or Firm*—Warren F. B. Lindsley

[57] ABSTRACT

A jig for use with routers and other augering equipment for cutting the proper openings in a door for the installation of mortise locks. The jig formed in a U-shaped configuration is placed over the edge of the door at a proper height from the door sill or from the heading of the door frame and through a pivotal end plate adjustably positions itself on the door regardless of the contour of the encased edge of the door.

11 Claims, 2 Drawing Sheets

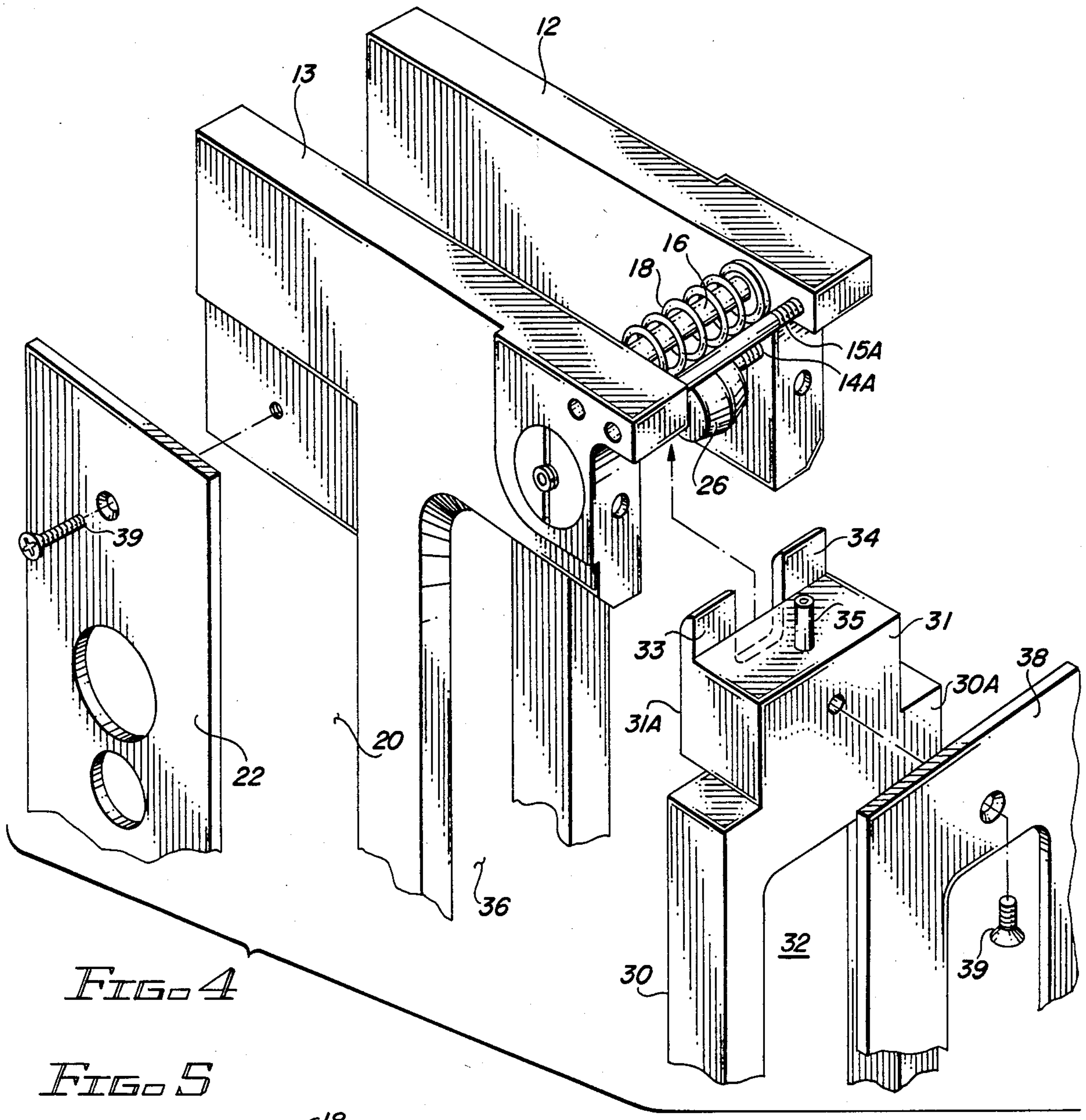
FIG. 4
FIG. 5
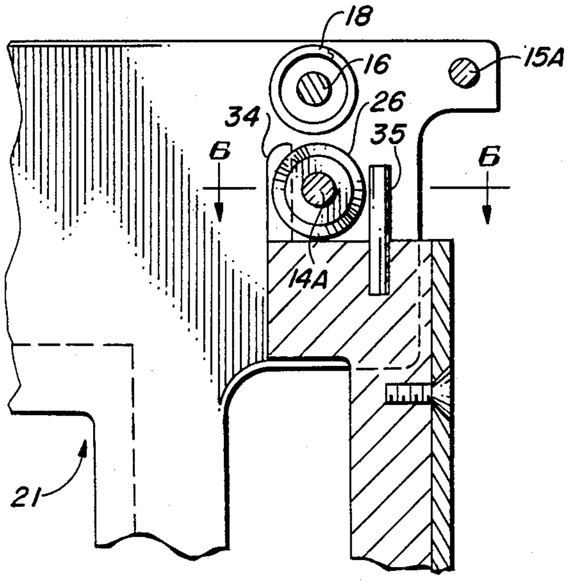
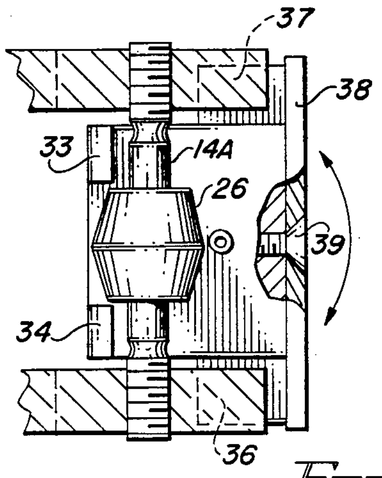
FIG. 6

DOOR HARDWARE PREPARATION JIG

BACKGROUND OF THE INVENTION

This invention relates to jigs and more particularly, to a jig for use with a router or similar tool for cutting the proper openings in a door for the installation of cylindrical and mortise locks and other latching or securing devices.

Most of these devices require a rectangular opening in the edge of the door and one or more related holes on the side of the door for keyed cylinders, thumbturns, knobs, levers, indicators or other items as may be required for proper function of the device.

DESCRIPTION OF THE PRIOR ART

At the present time, door lock preparation is done by a combination of multiple drills and routers, whether jigged or programmed in a shop or layed out with a pencil and ruler or spotting template in the field.

Accordingly, a need exists for a jig that can be readily applied to the door using only one locating measurement that guides the actual cutting tool to produce openings in the door with consistent accuracy even at the installation site.

SUMMARY OF THE INVENTION

In accordance with the invention claimed, a new and improved jig is disclosed employing replaceable templates for use with routers or similar tools for accurately and uniformly forming the openings in the edge and faces of a door for the installation of finish hardware.

It is, therefore, one object of this invention to provide a new and improved jig for mounting over the edge of a door for use with routers or other augering equipment to prepare doors for receiving like items.

Another object of this invention is to provide a new and improved jig for use in preparing openings in doors which employs detachable templates, each template set being for a particular item.

A further object of this invention is to provide a new and improved jig for mounting over the edge of a door for use in preparing openings which adjusts itself parallel to the particular plane of the door edge while maintaining the same openings on each side of the door on an axis perpendicular to the side at a preordained distance from the door edge centerline.

Further objects and advantages of the invention will become more apparent as the following description proceeds and the features of novelty which characterize this invention will be pointed out with particularity in the claims annexed to and forming part of this application.

BRIEF DESCRIPTION OF THE DRAWINGS

The present invention may be more readily described by reference to the accompanying drawings in which:

FIG. 4 is an exploded partial view of the parts of the jig shown in FIG. 1;

FIG. 5 is a cross-sectional view of FIG. 2 taken along the line 5—5; and

FIG. 6 is a cross-sectional view of FIG. 5 taken along line 6—6.

DESCRIPTION OF THE PREFERRED EMBODIMENT

Figure 1:
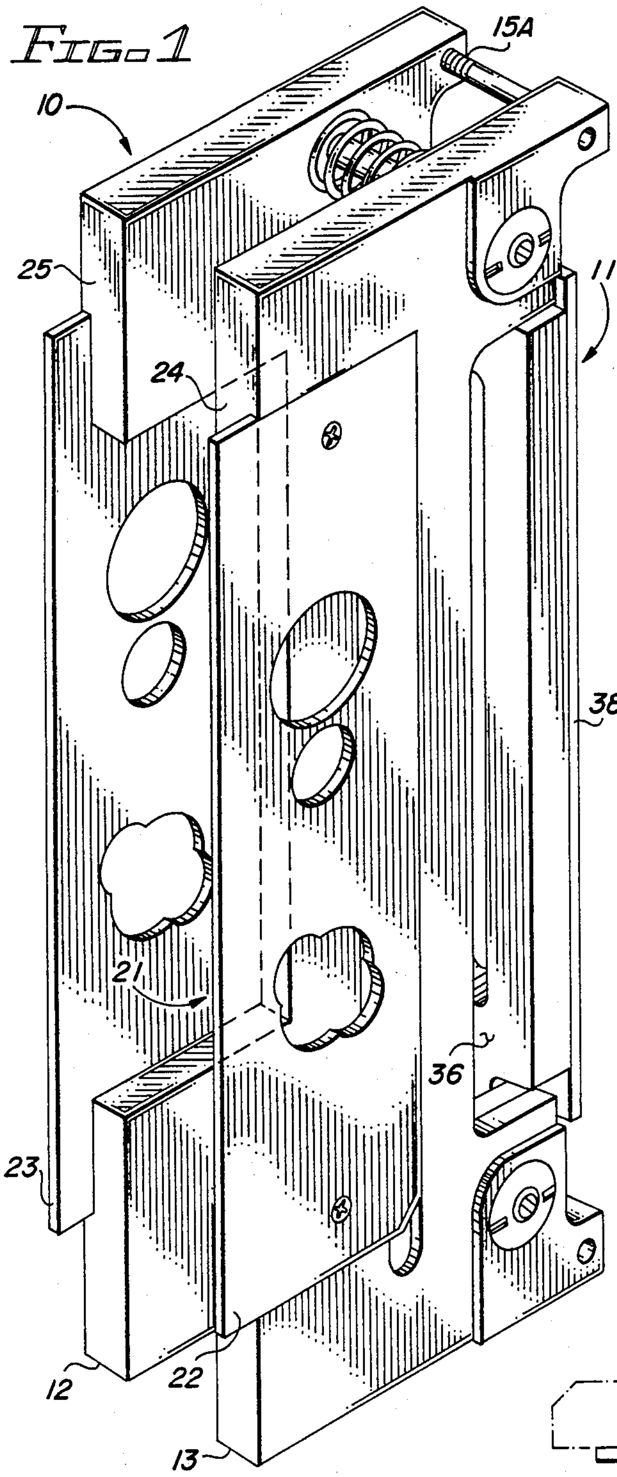
FIG. 1 is a perspective view of the jig embodying the invention.
Figure 2:
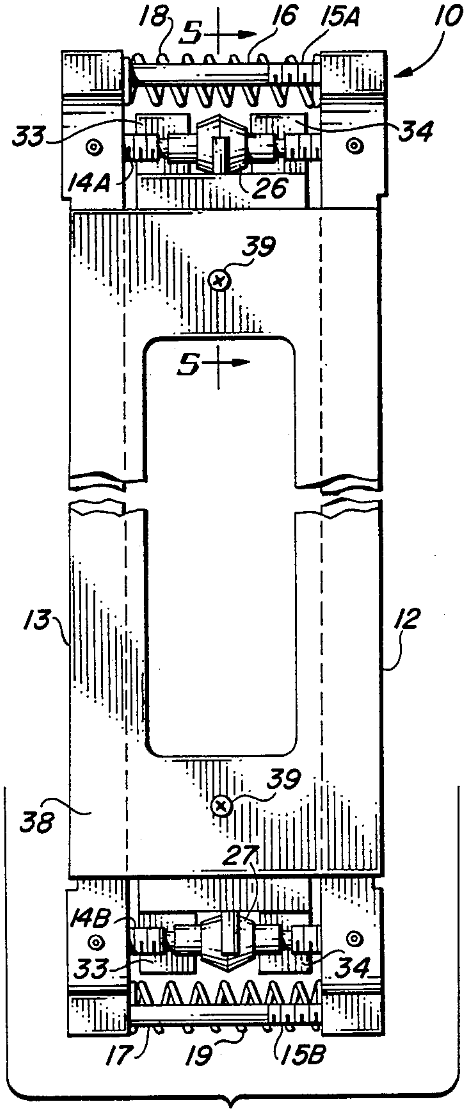
FIG. 2 is a right end view of FIG. 1.

Referring more particularly to the drawings by characters of reference, FIGS. 1-6 disclose a door mortising jig 10 comprising a frame 11 which may be defined as a U-shaped configuration formed by a pair of members, legs or side plates 12 and 13 which are spacedly held together by a pair of main bolts 14A and 14B which form the bite of the U-shaped configuration. A pair of anti-splaying bolts 15A and 15B are mounted between the side plates 12 and 13 to keep the side plates parallel as they are together upon proper adjustment. Each of the bolts 15A and 15B have their heads countersunk into side plate 13 with their other ends threadedly attached to side plate 12, positioned one at each end of side plates 12 and 13 at a common side of frame 11.

A second pair of alignment studs 16 and 17 are mounted to extend between and are journaled in side plates 12 and 13 of frame 11, one at each end of the frame at a point spaced from, but adjacent to, anti-splaying bolts 15A and 15B. Each of studs 16 and 17 may be provided with compression springs 18 and 19, respectively, which together with anti-splaying bolts 15A and 15B keep the legs separated a variable distance and provide for limited independent lateral pivotal movement of side plates 12 and 13 relative to each other.

It should be noted that side plates 12 and 13 are provided with contoured slots 20 and 21, respectively, cut into common edges 24 and 25 thereof, longitudinally thereof for detachably receiving replaceable templates 22 and 23, respectively, in the slots on opposite sides of the frame, as shown in FIG. 1.

To complete the U-shaped configuration of frame 11, an end plate 30 is mounted to extend between side plates 12 and 13 at the right end of the frame, as shown in FIGS. 1 and 4 This end plate, having contoured ends 31, outlines a rectangular slot 32 extending longitudinally thereof and laterally therethrough for detachably receiving in or over slot 32 a template 38 for outlining an opening to be formed in the edge of a door. A pair of spaced tabs 33 and 34 are arranged at each end of the plate to extend laterally outwardly thereof for providing in combination with end 31 a bearing surface 31A for engaging the edge of the door.

A pair of pins 35 provided to extend outwardly of each end of end plate 30 are spaced a predetermined distance from tabs 33 and 34 to provide openings therebetween for receiving self-centering end plate alignments 26, 27 which are formed around main bolts 14A and 14B, as shown in FIG. 6.

In the assembly of U-shaped frame 11, plate 30 is positioned between legs 12 and 13 within slots 36 and 37 formed therein longitudinally of their right ends, as shown in FIG. 1. Tabs 33 and 34 at each end of the end plate extends inwardly of the right end of the frame with self-centering end plate aligners 26 and 27 positioned between tabs 33 and 34 and end plate retainer pins 35. Thus, end plate 30 is loosely held in slots 36 and 37 of legs 12 and 13 for limited pivotal movement when frame 11 is mounted over the edge of a door.

Template 38 is threadedly attached to end plate 30 by bolts 39 covering the exposed right face 30A of the end plate.

Figure 3:
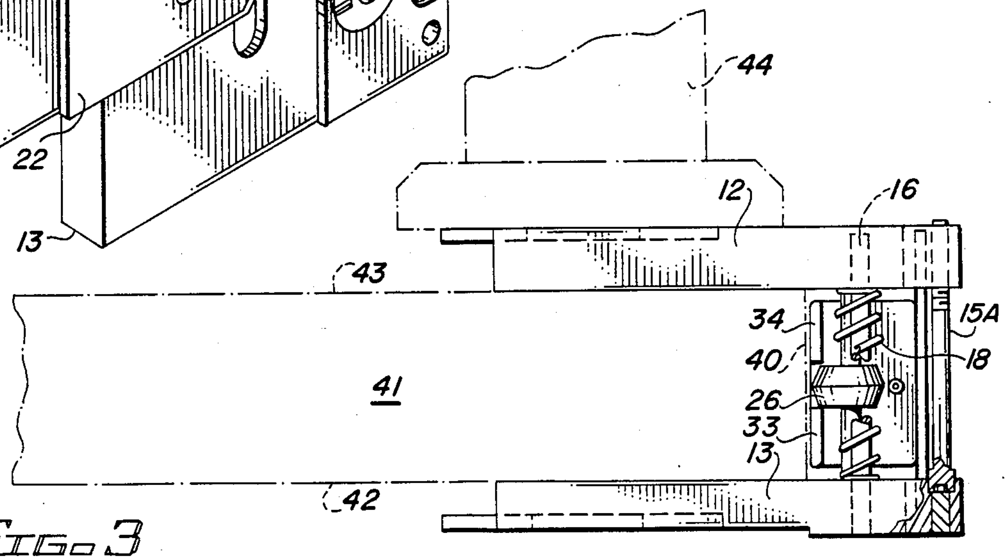
FIG. 3 is a top view of FIG. 1 with an associated door and router shown in dash lines.

When jig 10 is placed over the edge of a door, end plate 30 pivotally moves to adjust itself on edge 40 of a door 41, as shown in FIG. 3, whether edge 40 is perpendicular to faces 42 and 43 of the door or provided with a beveled or contoured edge.

DESCRIPTION OF ASSEMBLY

In mounting the jig on a door, the legs 12 and 13 of the jig are slid over the planar surfaces 42 and 43 of the door until end plate 30 of the jig rests with its surface 31A against edge 40 of the door.

The left and right side plates 12 and 13 are held together and tightened on the door by bolts 14A and 14B. These bolts are left hand threaded at one end and right hand threaded at the other, and are machined to accept an allen wrench.

End plate 30 is inserted into frame 11 with aligning tabs 33 and 34 being positioned on the sides of self-centering aligners 26 and 27. Clearance between the tabs and aligners is minimal. As main bolts 14A and 14B are rotated, the arrangement of the self-centering aligners and tabs keep end plate 30 vertically centered between plates 12 and 13. End plate retainer pin 35 is a common roll pin that keeps the end plate in place.

Alignment studs 16 and 17 are threaded into one side plate 12 or 13 and slip fit into the other side plate. This keeps side plates 12 and 13 parallel in two planes.

Springs 18 and 19 keep plates spread apart for ease of installation on the door.

Anti-splaying bolts 15A and 15B keep side plates 12 and 13 flat on the sides of the door when the jig is tightened on the door. They are threaded into one side plate and slip fit into the counterbore of side plate 13 until the head of the bolt contacts the shoulder of the counterbore which bolt position can be adjusted with an allen wrench inserted into the through-hole recessed into side plate 13.

DESCRIPTION OF OPERATION

Templates 22, 23 and 38 are chosen to correspond to finish hardware being installed on the door. The templates are attached to the jig by suitable screws 39. The locations of the openings in any given set of templates are premachined to those specified by ANSI (American National Standards Institute) or hardware manufacturer. The jig is then placed over edge 40 of door 41 at the desired location and main bolts 14A and 14B are tightened lightly by turning clockwise. Anti-splaying bolts 15A and 15B are then turned counterclockwise until they lightly contact recessed shoulders in side plates 12 and 13. Main bolts 14A and 14B are then tightened to the desired torque.

A router 44, shown in FIG. 3, is then inserted into any desired opening in the jig and is turned on, plunged to a predetermined depth into the door edge 40 and surfaces 42 and 43 and moved laterally in all directions until all material is removed within the limits of the opening in the template. This step is repeated at all chosen openings in the templates until all required holes have been machined in the door. The jig can then be removed from the door and additional work on the door performed, if any, followed by the installation of the hardware or the chosen lock.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention, what is claimed and desired to be obtained by United States Letters Patent is:

1. A jig for use in cutting openings in the edge and faces of a door for the installation of hardware comprising:

a frame, said frame comprising a pair of elongated side plates spacedly positioned and interconnected in a side by side arrangement by a pair of spacedly positioned bolts extending therebetween along a common longitudinal edge of said side plates, said side plates each having an exposed face with at least one opening extending laterally therethrough, a pair of first and second templates, one mounted on the exposed face of each of said side plates over the opening formed therein, an end plate having an opening extending laterally therethrough, mounted across said common longitudinal edge of said side plates, said end plate having a bearing surface extending longitudinally thereof, one at each of its ends, means journaled on and between said side plates along said common longitudinal edge of said side plates and positioned to hold said end plate in a self-adjusting pivotal position between said side plates with the bearing surfaces positioned for engaging the edge of an associated door, and a third template mounted over said opening of said end plate, whereby when the jig is mounted over the edge of a door, said end plate adjustably positions the jig on the door.

2. The jig set forth in claim 1 in further combination with:

a pair of anti-splaying bolts mounted between and along said common longitudinal edge of said side plates, one at each end thereof and spaced from said bolts for adjustably controlling the movement of said side plates relative to each other.

3. A jig for use in cutting openings in the edge and faces of a door for the installation of hardware comprising:

a frame, said frame comprising a pair of elongated side plates spacedly positioned and interconnected in a side by side arrangement by a pair of spacedly positioned bolts extending therebetween along a common longitudinal edge of said side plates, said side plates each having an exposed slotted face on which templates are mounted, one on each face, a pair of first and second templates, one mounted on the exposed face of each of said side plates over the slot formed therein, an end plate having an opening extending laterally therethrough, mounted across said common longitudinal edge of said side plates, said end plate having a bearing surface extending longitudinally thereof, one at each of its ends for engaging an associated door, said end plate having a pair of tabs, one pair extending laterally out of each of its ends and a pair of pins, one extending laterally out of each of its ends and spaced from the associated pair of tabs, a pair of end plate aligners journaled on and between said side plates along said common longitudinal edge of said side plates and positioned to lie one between said pair of tabs and said pin at each end of the jig for holding said end plate in a self-adjusting pivotal position between said side plates with said bearing surfaces positioned for engaging the edge of an associated door, and a third template mounted over said opening of said end plate, whereby when the jig is mounted over the edge of a door, said bearing surfaces of said end plate adjustably positions the jig on the door.

4. The jig set forth in claim 3 wherein:

said frame comprises a U-shaped configuration, and said side plates comprise the legs of said U-shaped configuration.

5. The jig set forth in claim 3 wherein:

said aligners comprise a substantially cylindrical configuration extending in a longitudinal direction between said side plates.

6. The jig set forth in claim 3 wherein:

said side plates, said end plate and said first, second and third templates each comprise planar configurations.

7. The jig set forth in claim 3 wherein:

said common longitudinal edges are slotted for receiving therein said end plate.

8. The jig set forth in claim 3 wherein:

said first and second templates are detachably mounted, one on the exposed face of each of said side members.

9. The jig set forth in claim 3 wherein:

said third template is detachably mounted on said end plate.

10. The jig set forth in claim 3 in further combination with:

a pair of rods mounted to extend between and journaled in said side plates, one at each end of the jig along said first common longitudinal edge, and compression spring means, one mounted on each of said rods to extend between said side plates.

11. The jig set forth in claim 3 in further combination with:

a pair of anti-splaying bolts mounted between and along said common longitudinal edge of said side plates, one at each end thereof and spaced from said bolts for adjustably controlling the movement of said side plates relative to each other.

* * * * *